Aug. 10, 1926.
W. J. ANDRES
BRAKE CAM AND SHAFT
Filed March 29, 1926
1,595,136
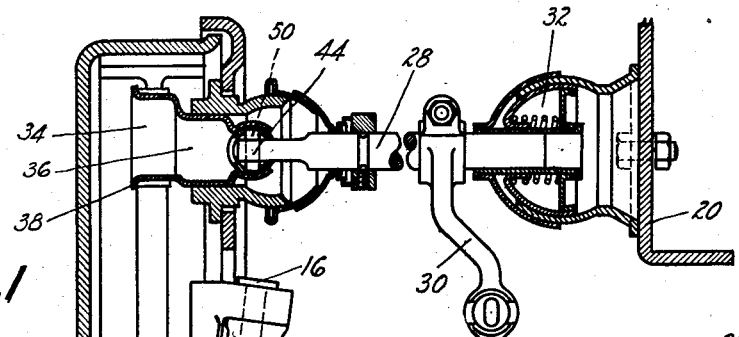
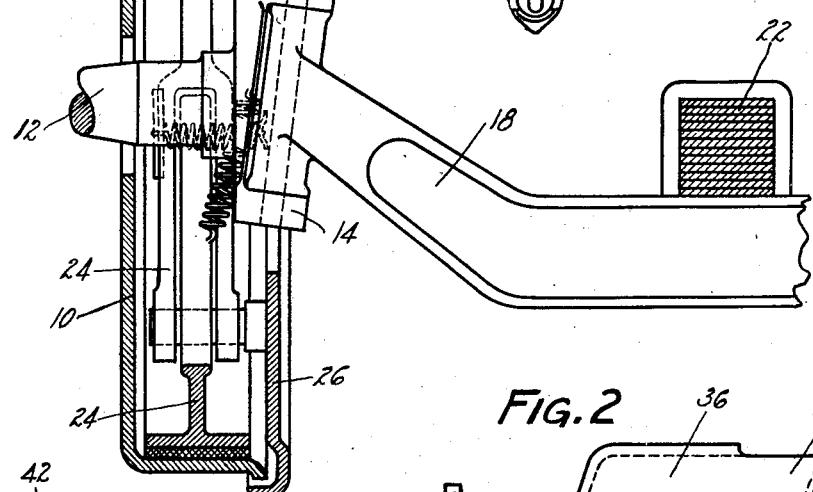
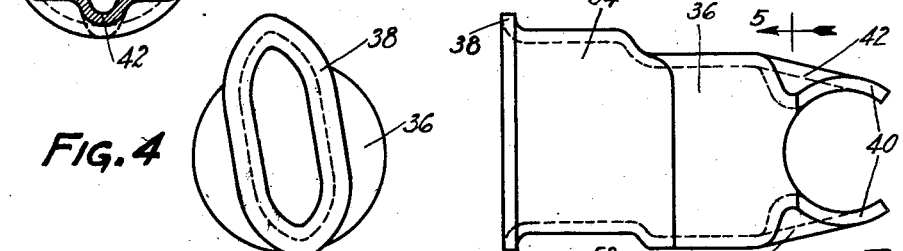
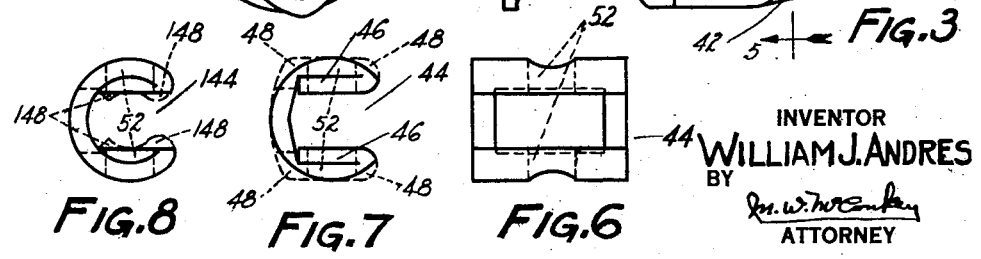
INVENTOR
WILLIAM J. ANDRES
BY
ATTORNEY Patented Aug. 10, 1926.

1,595,136

UNITED STATES PATENT OFFICE.

WILLIAM J. ANDRES, OF SOUTH BEND, INDIANA, ASSIGNOR TO BENDIX BRAKE COMPANY, OF CHICAGO, ILLINOIS, A CORPORATION OF ILLINOIS.

BRAKE CAM AND SHAFT.

Application filed March 29, 1926. Serial No. 98,115.

This invention relates to brakes, and is illustrated as embodied in an integrally drawn cam and shaft section, with a novel sheet-metal connecting device. An object of the invention is to provide a less expensive cam and shaft suitable for light brakes, by forming a hollow drawn unit preferably including both the cam and its shaft. The outer end of the hollow cam may, if desired, be flanged outwardly to confine the ends of the brake shoes. The end of the shaft is preferably formed into a pair of cylindrical jaws, arranged crosswise of the shaft, and embracing a novel connecting device herein shown as formed from sheet metal.

Other features of novelty relate to the connecting device, shown as a C-section member embracing the flattened end of the brake-applying shaft, and to other novel and desirable particular arrangements which will be apparent from the following description of one illustrative embodiment shown in the accompanying drawing, in which:

Figure 1 is a vertical section through a brake and associated parts, including the parts forming the subject-matter of the present invention;

Figure 2 is a top plan view of the novel integrally-drawn cam and camshaft;

Figure 3 is a side elevation of the cam and camshaft;

Figure 4 is an end elevation of the cam and camshaft looking from the left in Figure 3;

Figure 5 is a section through the camshaft on the line 5—5 of Figure 3;

Figure 6 is an elevation of the novel connecting device, detached, and looking toward it from the right in Figure 1;

Figure 7 is an end elevation of the device, showing in dotted lines its form before machining; and Figure 8 is a similar end elevation of a slightly different form of the device, showing in dotted lines its form before machining.

The invention is herein illustrated as embodied in parts of a brake of the type fully disclosed in Patent No. 1,567,716, granted Bendix Brake Company on Dec. 29, 1925, on an application of Adiel Y. Dodge. The brake includes a drum 10 rotating with a wheel (not shown) mounted on the spindle 12 of a knuckle 14 swivelled, by a king-pin 16 or the like, at one end of a front axle 18 which, with a rear axle (not shown), supports a chassis frame 20 through the usual springs 22.

The brake also includes suitable shoes or the like 24, which may be pivotally anchored on a backing plate 26 carried by the knuckle 14, and which are to be forced against the drum by force from a shaft 28 operated by an arm 30, and which may be slidably and universally supported at its inner end by a suitable support 32. The present invention relates to the novel means through which shaft 28 or its equivalent acts to apply the brake.

As illustrated more particularly in Figures 2–5, one part of this means is a one-piece integrally drawn cam 34 and cylindrical shaft 36. The cam is preferably asymmetrical with respect to the shaft,—i. e. its center is offset from the axis of the shaft, to give the differential movement to the shoe ends necessary in the above-identified brake,—and it may be flanged outwardly at 38 to confine the shoe ends against lateral movement.

At the opposite end, shaft section 36 is formed as a pair of jaws 40, providing a cylindrical bore extending crosswise of the shaft. At the center, there may be strengthening ribs 42 where the jaws merge into the shaft section, so that the jaws form in effect a pair of spaced bearings for a novel sheet-metal connecting device 44.

Device 44 is rolled from a strip of sheet metal, with the ends 46 doubled inwardly. It is then turned or otherwise machined to remove the superfluous material 48 shown in Figure 7 in dotted lines, leaving an outwardly cylindrical C-section device fitting between jaws 40, and having opposite parallel surfaces embracing the flattened end of shaft 28, and secured thereto by a pin 50 (Figure 1) arranged in alined openings 52 in device 44.

As shown in Figure 8, a similar device 144 may be rolled cylindrically in the first place, the superfluous material 148 being machined from the inside of the device, for example by a milling operation.

While an illustrative arrangement has been described in detail, it is not my intention to limit the scope of the invention to that particular arrangement, or otherwise than by the terms of the appended claims.

I claim:

1. A drawn cam and shaft for a brake having a hollow generally cylindrical shaft section and an adjacent hollow cam integral therewith and having its opposite edge flanged outwardly.

2. A drawn cam and shaft for a brake having a hollow generally cylindrical shaft section and an adjacent hollow cam integral therewith.

3. A drawn cam and shaft for a brake having a hollow generally cylindrical shaft section and an adjacent hollow cam integral therewith and arranged asymmetrically with respect to the axis of the shaft.

4. A drawn cam and shaft for a brake having a hollow cylindrical shaft section with a hollow cam connected integrally therewith at one end and having cylindrical cross jaws at its other end arranged to embrace a cylindrical connecting device.

5. A drawn cam and shaft for a brake having a hollow cylindrical shaft section with a hollow cam connected integrally therewith at one end and having cylindrical cross jaws at its other end arranged to embrace a cylindrical connecting device, the jaws being merged into the shaft section by central strengthening ribs leaving the end portions of the jaws as spaced cylindrical bearings for the connecting device.

6. A hollow cylindrical brake cam shaft having its end formed into cross jaws arranged to embrace a cylindrical connecting device, the walls of the camshaft and jaws being throughout of substantially uniform thickness.

7. A drawn hollow cylindrical brake camshaft having its end formed into cross jaws arranged to embrace a cylindrical connecting device.

8. A C-section cylindrical connecting device formed from a flat strip of metal rolled on itself and having its ends doubled inwardly, and having metal removed from the double-thickness portions so formed to provide opposite parallel flat surfaces to embrace the flattened end of a shaft and an outwardly cylindrical bearing surface.

9. A C-section cylindrical connecting device formed from a flat strip of metal rolled on itself and having its ends doubled inwardly.

In testimony whereof, I have hereunto signed my name.

WILLIAM J. ANDRES.